Dec. 30, 1930.                     E. E. REID                  1,786,630
                                   PERFUMERY
                              Filed Oct. 31, 1922
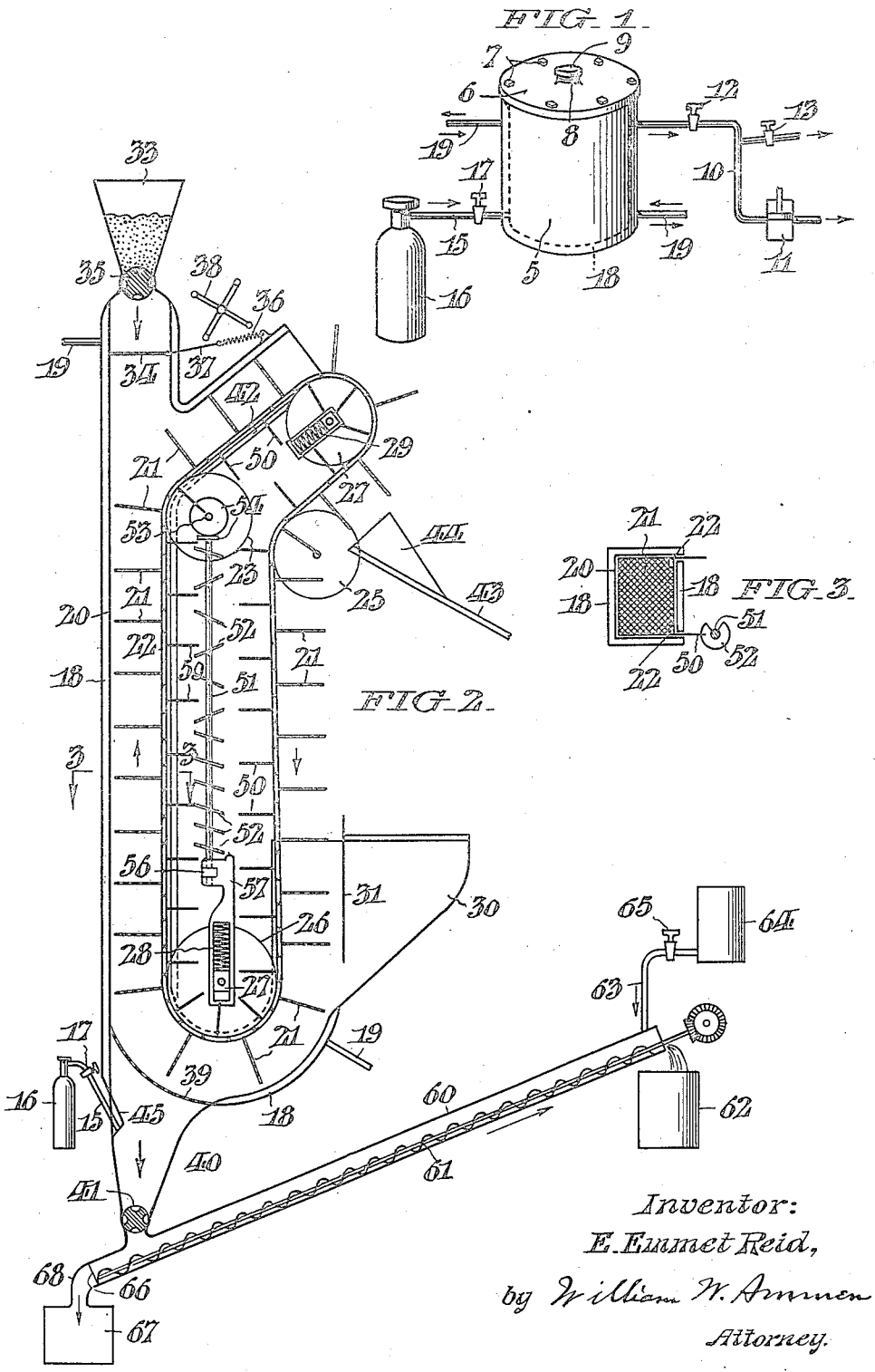
Inventor:
E. Emmet Reid,
by William W. Ammen
Attorney.

Patented Dec. 30, 1930

1,786,630

UNITED STATES PATENT OFFICE

EBENEZER EMMET REID, OF BALTIMORE, MARYLAND

PERFUMERY

Application filed October 31, 1922. Serial No. 598,094.

My invention relates to perfumery and the like, and is more particularly concerned with natural odors and oils from flowers, etc. The invention affords an impregnation of flower odors which can be made very rich or concentrated; whence the odors may be released either gradually or rapidly; and whence they can be very easily and conveniently recovered for use in other forms. Furthermore, my invention affords a highly advantageous process or technique for the abstraction of the odors from the flowers themselves,—in some respects analogous to the process known as "enfleurage". (For a description of this process, see the Encyclopædia Britannica, 9th edition, vol. 15, p. 606, and vol. 17, pp. 769, 770; 11th edition, vol. 15, p. 278, and vol. 20, p. 52).

Generally speaking, the essential characteristic odorous principles of the perfumes of flowers (and of other such plant odors, etc.) are in the nature of ethereal oils: not oleaginous to the touch, and leaving no permanent grease spot; volatile, and generally distilling unchanged; insoluble in water, or nearly so, but freely soluble in various organic solvents such as alcohol, ether, and fatty and mineral oils. Some have heretofore been obtained from the plants by distillation with steam, and some by maceration; while others (present in the plant only in very small amount, or too tender for distillation or maceration processes) have been obtained by enfleurage. For initially getting the odors from the flowers, this last process (and likewise the kindred process of maceration) depends on solution of the odors in high-grade grease of some sort, such as purified lard, or the finest olive oil; while for afterward recovering the odors from the grease, the process depends on their solution in ethyl alcohol. Direct alcoholic extraction of the odors from the flowers themselves has not been found commercially practicable.

Though employed for a great many years, and still the accepted method of obtaining odors such as above indicated, the process of enfleurage is far from satisfactory.

It is not practicable to actually mix the flowers (or their petals) with the enfleurage grease to bring about solution of the flower odors in the grease, owing both to the messiness of such a procedure, and to the difficulty of afterward completely separating grease and flowers without contamination of the final product with other substances from the flowers, or some other deleterious effect. In practice, therefore, the flowers or petals are laid on thin layers of lard in glass-bottomed trays (or on wire gauze close over the lard), and the trays are stacked to exclude the air somewhat, so that as the odorous flower oils vaporize and come off, they will be drawn into solution in the lard. Or, in the case of olive oil, the flowers are laid on cloths saturated with the oil. Under such conditions, the average distance of the flower petals from the grease is not less than half an inch, at best; and the absorption of all the odors that one batch of flowers will yield may take an entire day. Since many batches of flowers are often required to saturate one tray or charge of grease, the process is extremely tedious and time-consuming.

Furthermore, both kinds of enfleurage grease (lard and oil) are somewhat soluble in the alcohol with which they are digested to recover the odors, so that the essences (alcohol solutions of the odors) resulting from the digestion are somewhat contaminated with the grease. So long as the grease is perfectly sweet and fresh, this is not of vital importance,—though it does, indeed, make the essences less pure and clean than might be desired. Sometimes, however, the grease becomes rancid during its prolonged exposure to successive batches of flowers; and then the essence produced from it is unpleasantly tainted, and practically worthless. In any case, moreover, the residue of grease from the alcohol digestion cannot ordinarily be reused with safety; and as only the finest grades of grease will answer the purpose, the item of expense for grease is very considerable. Efforts to substitute high-grade mineral oils (such, for instance, as that now marketed under the name of "Nujol") for lard and olive oil as enfleurage greases have not been practically successful,—owing, in part, to the generally freer solubility of such mineral oils in alcohol and the like.

In the abstraction of flower odors by means of my invention, such drawbacks as these can be entirely obviated. The process can be carried out much more rapidly than enfleurage as hitherto known; contamination of the flower odors can be avoided; and the cost of obtaining the odors can be kept much lower.

In general, my process differs from grease enfleurage as regards both the character of the agents employed to take or absorb the odors from the flowers, and the behavior of such agents toward flowers and odors. Instead of dissolving the odors in grease, I proceed by impregnating with them a medium that need not be (and preferably is not) greasy, pasty, or liquid,—or, indeed, possessed of any of the other objectionable properties of lard or olive oil. With a suitably solid medium, that can readily be separated from the flowers, I find it feasible to bring flowers and absorbent into closer and more effective odor-transferrent proximity than is possible with enfleurage grease,—into direct and intimate contact or intermixture, even. The media which I prefer to employ absorb the vaporous odors much more powerfully and rapidly than lard or olive oil, and in greater amounts; will not contaminate or taint the odors in any deleterious way; and can be reused over and over again with perfect safety. The preparation resulting from impregnation of the medium with the odors may in some cases (if desired) be used directly as a perfume, without any special steps of releasing the odors and transferring them to other media.

For impregnation with the odors may be used various media possessing some or all of the properties hereinafter indicated, in greater or less degree, and especially that of holding or retaining vapors in an "external" way, so to speak, rather than by combination with them in any way so intimate as solution, for example. Particularly advantageous, also, are a highly interstitious or porous character or condition of the medium, and a rather granular or powdery form. The media which I prefer to employ are interstitious or porous mineral gels, of inert character, possessing a marked capacity for "adsorbing" vapors (as it is termed): especially gels of stable metallic or metalloidal oxides, and particularly silica gel. Silica gel of great adsorptive power (and otherwise well suited for my purposes) can be prepared by adding to a solution of sodium silicate of a strength corresponding to 4% of $Na_2O$ an amount of 10% aqueous solution of hydrochloric acid just sufficient to neutralize all the alkali; allowing the resultant gel to set, and then breaking it up and washing it well with water; and finally drying it in a current of dry air at progressively increasing temperatures up to about 300° to 500° C., so as to leave the product only slightly or very moderately hydrated. Thus prepared, the gel, is a brittle, glassy mass, and readily reduced to granules or powder of any desired degree of fineness,—50 to 100 mesh to the linear inch being one suitable size. In this form, the gel is a fine, dry white powder; insoluble in organic solvents or in water, though highly hygroscopic; incombustible, and generally inert; clean and non-adhesive. Also, highly adsorptive charcoal (such as developed for use in gas-masks during the late war) may be used to advantage,—preferably in similarly powdery form. Such charcoal is more or less on a par with silica gel in adsorptive capacity and in various other properties, though inferior in cleanliness and incombustibility. Both charcoal and silica gel are relatively inexpensive.

Highly adsorbent media like charcoal and silica gel will take up many times their own volume of gas or vapor,—in some cases, more than a hundred fold. Though not fully understood at present, this high adsorptive power seems to be largely attributable either to the surface area of substance exposed by virtue of its highly interstitious physical structure, or to the multitude and extreme fineness of the interstices or pores themselves,—or perhaps to both. Intrinsic properties of the substance itself and of the vapor involved are also influential factors. Apparently, these substances have the power of actually liquefying the adsorbed vapor on their interstitial surfaces or in their pores, and of absorbing or holding them as liquids, in accordance with the principles of capillarity and surface tension. At any rate, they do in many cases produce a spacial or volumetric condensation of the vapor comparable to that involved in actual liquefaction.

These substances retain the flower odors in an "external" way, so to speak, without either reacting with them chemically or combining with them by solution or the like. They are also practically inert with respect to other reagents which it may be desired to employ in the process,—whether for release or recovery of the odors from the impregnation, or for other purposes. The odors can be easily released from the tenure of such media, and secured quite uncontaminated and unaffected in any way. The general inertness of these media is another desirable quality, and is of advantage in facilitating their regeneration or reconditioning for reuse.

For the benefit of those desiring to practice my invention, I have hereinafter described the best ways known to me for abstracting flower odors with special reference to the use of silica gel or charcoal for adsorptive impregnation with such odors. For convenience, and in recognition of its applicability to the same delicate and difficult classes of odors, I have sometimes referred to my process as an improved enfleurage,—notwithstanding its radical differences from enfleurage as hitherto known in principle, as well as in technique.

In the drawings, Figure 1 is a diagrammatic or sketchy general view of apparatus suitable for use in my process of enfleurage.

Figure 2 is a diagrammatic vertical sectional view of another apparatus for carrying out my process, suitable for continuous operation on a large scale.

Figure 3 shows a horizontal section through the apparatus illustrated in Figure 2, taken as indicated by the line 3—3 in that figure.

For my process of abstracting the odors, flowers or blossoms may be prepared very much as for grease enfleurage. That is to say, the flowers may be gathered from the plants when nearly full blown, and the flowers proper separated from other portions of the plant as completely as possible. Indeed, the petals (which generally contain most of the odorous principles) may even be separated from less odorous portions of the flower, and used alone.

In order to abstract the odors and impregnate with them the gel or charcoal, etc., as rapidly and efficiently as possible the flowers or petals may be well mixed with the powdery medium, and enclosed in any suitable container. A drum 5 of stout sheet metal (Fig. 1), with a gasketed lid or cover 6 that can be securely fastened on and made air-tight, is well adapted for the purpose. The flowers and the medium may be sprinkled into the container 5 either concurrently, or in alternate layers; or they may be intermingled and introduced into the container in any other way that will result in thorough and intimate intermixture or interspersion. The relative proportions of flowers and medium used may vary so greatly that useful specific directions can hardly be given: the proportions must usually be determined mainly by considerations of practical convenience, such as ease in securing sufficiently uniform interspersion, rather than by the high adsorptive capacity of silica gel or charcoal. In general, the quantity of powdery medium required for adsorptive impregnation need seldom be much more than just enough to fill the voids of the flowers when put into the drum loose, without subsequent pressing or packing down in any way, and may be considerably less when the flowers are used whole, or will not lie closely together for any reason. Volumetrically, the quantity of flowers will generally be at least several times that of the absorbent medium. In order that the vapors may circulate freely, close packing of the charge should ordinarily be avoided; and to this end, the total charge should not be too large. Preferably, however, the charge should pretty well fill the container 5 used.

The cover 6 having been placed on the container 5 and the latter made perfectly tight, if desired, by tightening up its securing bolts 7, the container may be left thus closed until the absorption of the flower odors by the medium is sufficiently complete, as indicated by the substantial or relative absence of perceptible odor about the charge. As to the actual length of exposure of medium to flowers required for complete transfer of odors, no specific directions can be given, since it depends on a variety of factors that often may not be determinable or controllable with any accuracy,—such as freshness and dryness of the medium, strength and volatility of the odors in the flowers, temperature of the charge, etc. In practice, nevertheless, the best exposure for any particular flowers under given conditions can be determined quite accurately enough (after a little experience) by periodically smelling the charge through a short test neck or nipple 8 opening through the cover 6. As shown, this nipple 8 can be easily opened or closed tightly by unscrewing or screwing down a gasketed cap 9 thereon. Generally speaking, the container 5 should remain quietly at rest during the exposure period, rather than be agitated or tumbled in any way, for the reason that agitation may tend to separate the flowers and the powdery medium.

The transfer of odors can be hastened, if desired, by subjecting medium and flowers to a suitably tenuous atmosphere during the period of exposure, such as a vacuum or a light gas. For this purpose, the container 5 may be provided with suitably valved connections, etc., for exhaustion or discharge of air, and for admission of gas to replace it. As shown, there is an exhaust and discharge pipe 10 leading off from the upper part of the container 5 to evacuating means such as a vacuum pump 11 of any suitable type. The pipe 10 is provided with a stop and control valve 12, and also, therebeyond, with a petcock 13 for air or gas discharge or admission. There is also a gas supply pipe 15 leading off from the lower part of the container 5 to a gas supply reservoir 16 (in the form of a cylinder of compressed hydrogen), and provided with a stop and control valve 17. By these means, the container 5 may be evacuated as soon as closed, and its charge kept under vacuum throughout the period of exposure; or the air in the container may be displaced and blown out through the vent cock 13 by hydrogen admitted from the source 16; or the air may be replaced with hydrogen, and the latter then exhausted by operation of the pump 11 after the valves 13 and 17 have been closed, so as leave only a very attenuated residual atmosphere of this light gas in the container during the exposure of the medium to the flowers.

When the container 5 or the test cap 9 is to be opened, any vacuum in the container may be broken by admission of air through the petcock 13 and the valve 12, or of hydrogen through the valve 17.

The lowering of the atmospheric density in the container 5 resulting either from a moderate vacuum (such as 28" or 29" of mercury, say) or from an atmosphere of light gas like hydrogen will facilitate the vaporization of the odorous oils out of the flowers, and thus facilitate and hasten their transference to the absorbent medium. As shown, the container 5 is provided with a jacket 18 through which a temperature controlling agent (such as water or steam, for example) can be circulated by means of piping 19, in order to secure the temperatures most favorable to rapid and efficient vaporization and absorption of the flower odors.

When the transfer of odors is sufficiently complete, the charge may be removed from the container 5, and the impregnated medium may be separated from the spent flowers by screening,—say through one sieve or screen so coarse as to pass anything but whole flowers or petals, and through any further and finer screens necessary to eliminate objectionable amounts of flower fragments from the powdery medium. The separated medium may forthwith be remixed with fresh flowers and recharged into the container 5, for reexposure and further impregnation or enrichment, and then once more separated off by screening as before. This may be repeated until the medium is saturated, or until absorption becomes too slow to be worth continuing.

Adsorptively impregnated silica gel or charcoal will retain its charge of odors quite tenaciously in air at atmospheric pressure, so that there is no risk of material odor losses during screening. If overheating is avoided, the impregnated gel can be kept in reasonably tight containers or packages a long time without loss or deterioration of the odors. In this way odors abstracted from tropical or other plants in their native habitat can be stored in the impregnation, so to speak, during transportation to markets or factories in other parts of the world. On the other hand, when the impregnated silica gel is freely exposed to the ordinarily humid atmosphere of regions like the eastern coast of the United States, the odors tend to be displaced and released by the water rapidly taken up by the hygroscopic gel,—so that the gel gradually discharges itself of the impregnant odors. This action is most marked in the case of the more volatile odors, so that impregnations of such odors may even be used as perfumes directly, in their original powder form.

To release and separate impregnant odors from the medium rapidly, for recovery and use in other forms, it may in some cases be found satisfactory to drive them out of silica gel or charcoal by mere displacement with a suitable agent, such as steam. For this purpose, steam at about atmospheric pressure (or even lower) may be passed into or through the medium in any convenient way, and the surplus steam coming off condensed. By using steam at less than atmospheric pressure for this treatment of the impregnated medium, the temperature can be kept down, and deterioration of some odors by overheating thus avoided. The odorous flower oils may be found dissolved in the water of condensation to some small extent; but for the most part, they float on the surface, so that they can readily be removed and segregated.

In general, however, it will be found preferable to release and separate odors from the impregnated medium by displacement with a solvent agent, such as ethyl alcohol. The impregnation may be leached with the solvent in a variety of ways, as by simply allowing an abundance of the solvent to stand with the impregnation in a suitable vessel, or by percolation of the solvent through the impregnation after the usual manner of filtering with bone-black, or on the countercurrent principle, as hereinafter described. The resultant alcoholic essence can be concentrated, if desired, by carefully evaporating off some of the alcohol, which vaporizes freely at a lower temperature than the flower oils. The alcoholic essence is directly useful as such in perfumery.

Owing to the inertness of silica gel and charcoal, such treatments of the impregnation with an odor displacing or solvent agent will separate and recover the odors from such media quite unaffected and uncontaminated by the latter.

After the medium has been discharged of the impregnant odors by such methods of displacement or solution, or in any other suitable way, this medium can be regenerated or prepared for reuse by treatment very similar to the final steps of its original preparation. In the case of silica gel, especially, all that is necessary is to steam it thoroughly and then dry it by heating it in a current of dry air until it is but little hydrated, as before. As this gel is inalterable and uninjured at temperatures as high as 700° C., no particular precautions are necessary. Charcoal, on the other hand, which burns at 500° C., requires more careful treatment.

When operations are to be conducted on a large scale, abstraction of odors and impregnation of the medium with them may be carried on progressively and continuously, by relative movement of flowers and absorbent medium in odor-transferrent proximity. For this purpose, flowers and medium may be progressed in opposite directions "through" one another (speaking of them en masse), in interspersion and even in direct contact. One way of thus passing medium and flowers (or petals) through one another in countercurrents is to elevate and agitate the flowers dispersed or spread out in layers over a series of screens or the like, at the same time causing the powdery medium to fall on and through the layers in succession, as shown in Fig. 2. The discharge of the powdery medium of its impregnant odors and their recovery may also be accomplished on the countercurrent principle, by progressing the medium and a fluid agent for releasing the odors in opposite directions in intimate contact with one another. For this purpose, the medium may be elevated against a downfall of liquid releasing agent, as also illustrated in Fig. 2.

The apparatus illustrated in Figs. 2 and 3 comprises an enclosure in the form of an upright "tunnel" casing 30, and a series of stiffly but elastically framed wire gauze screens 21 carried by alternate links of a pair of sprocket chains 22. The screens 21 are of amply coarse mesh to pass the powdery medium, but fine enough to hold the flowers effectually. The sprocket chains 22 are guided over sprocket wheels 23, 24, 25, and 26, one of which (23) drives, and two of which (24 and 26) preferably have their shafts mounted in bearings 27 slidable in guideways 28, and yieldingly urged into chain-tightening positions by helical compression springs 29. Flowers are supplied upon the screens 21 by gravity as the screens approach the lower sprockets 26, from a covered bin 30 whose steeply sloping bottom merges with the curved bottom wall of a U-shaped lateral extension or leg of the tunnel 20. The feed of the flowers can be controlled and regulated by means of a vertically sliding gate 31, which is preferably set to pass no more flowers to each screen than will just form a thin, scattering single layer thereon.

As each screen 21 rounds the lower sprockets 26, its charge of flowers is automatically transferred to that behind it, and spreads out more or less evenly over the latter, partly under the agitation of the screens as hereinafter described. As the screens ascend, silica gel raining down through the vertical tunnel 20 falls on and through the flower layers, being intimately mixed and brought in contact with the flowers by the continual agitation of the latter on the screens. As shown, the powdery medium is supplied from a hopper 33 over the top of the tunnel 20 and is distributed in a more or less uniform "rain" by a suitably fine sieve or screen 34 that is continually shaken or vibrated. The rate of feed of the medium to the subjacent screen 34 can be controlled and regulated by varying the operation of a longitudinally grooved rotary feed cylinder 35 in the exit of the hopper 33. The screen 34 is pivoted at one edge, and is held in a normally horizontal position by a helical tension spring 36 attached to its crank arm 37. It is shaken by a roller-pointed star-wheel 38 whose rollers wipe against the arm 37 in rapid succession.

At the bottom of the upright tunnel or trunk 20, the impregnated medium is separated from the flowers by screening through an inclined screen or sieve 39 in the bottom wall of the U-shaped lateral tunnel leg. From the screen 39, the falling medium is received in a subjacent hopper portion 40 of the casing 20, whence it is discharged by a longitudinally grooved rotary feed cylinder 41 in the hopper exit. This discharge feed 41 may, of course, be operated in definite correlation with the supply feed 35. At the top of the vertical tunnel or shaft 20, the spent flowers pass out through an upward sloping lateral extension or leg of the tunnel. This sloping leg has a "false" screen bottom 42 over which the flowers travel and are tumbled, so that any adhering powder may be shaken off and find its way back into the vertical tunnel. The flowers are finally discharged from the screens 21 by gravity, as the screens assume a steeply inclined position on their way from the sprocket 24 to the sprocket 25. They are received by a steeply inclined discharge chute 43, with flaring lateral guards at its upper end, and delivered to any convenient point of disposal. The unloaded screens 21 travel on down to the flower bin 30, and the cycle is repeated.

The screens 21 may be agitated during their travel in a variety of ways. As shown, the chain links that carry no screens are provided with rearward-extending arms or lugs 50, that project out through slots at the corresponding corners of the tunnel 20. Adjacent the projecting lugs are upright mutilated screws comprising upright shafts 51 each carrying a number of three-quarter turn screws segments 52 spaced considerably more than their pitch. These shafts 51 are driven from the horizontal shaft 53 on which the chain-driving sprockets 23 are fast, through variable speed and reversing disc gearing 54. When each upward-travelling chain-link lug 50 encounters a screw segment 52, the movement of the latter and of the link first rocks such link and then allows it to straighten out suddenly, as the lug end is released by the turning segment or wipes on past it. The result is a reverse rocking of the adjacent screen-carrying links (augmented by rocking of other links above and below, if occurring concurrently) and a rather violent vibration of the screens 21. The direction of the initial rocking and of the more violent recoil can be controlled by the direction of rotation of the shafts 51 and the right or left-hand pitch of their screw segments 52. Preferably, a few of the lower screw segments 52 are so pitched that their vibration acts cumulatively to throw and spread the flowers inward toward the chains 22 from the outer free ends of the screens 21 where they naturally lie piled after the screens round the lower sprocket 26; while higher up, adjacent pairs of segments may be oppositely pitched, so that their net action shall merely shake, scatter, and roll the flowers at random, without as a whole altering their distribution on the screens materially. The relations of chain pitch and screw segment spacing may be such that the screens 21 will be rocked either concurrently or at different times,—or one way at the upper portion of the shaft 51 and the other way below, as shown. Variation of the length of the vertical chain run as required by the rocking of the links is permitted by the yielding spring mounting of the sprocket shaft bearings 27, and the resulting compression of the springs 28 insures a sharp movement of the screens 21 when the link lugs 50 are released. As shown, the shafts 51 are held against the longitudinal thrust of the screw segments 52 by the engagement of their thrust shoulders or collars 56 between stationary bearing bracket members 57. Owing to the yielding mountings 27, 28 for the sprockets 24, the screens 21 are also agitated somewhat as they approach and leave these sprockets, so as to shake the powdery medium out of the spent flowers in the first case, and to shake the flowers themselves off the screens into the chute 43 in the second case. By varying the rate of revolution of the shafts 51 by means of the gearing 54, the vibration of the screens 21 can be adjusted and controlled just as desired.

If desired, the absorbent medium can be subjected to a tenuous atmosphere during exposure to the flowers in the apparatus of Fig. 2, by displacing the air therefrom with hydrogen or the like continually admitted to the discharge hopper 40 and allowed to ascend with the flowers to their exit. As shown, the provisions for such circulation of hydrogen are like those for admitting it to the container 5 of Fig. 1, and are marked with the same reference numerals as a means of dispensing with merely repetitive description. The opening of the gas supply pipe 15 into the hopper 40 is shown as provided with a protective hood 58 of curved sheet metal, to prevent the pipe from becoming clogged up with the falling powder. If desired, likewise, the temperature in the apparatus can be controlled by means of a surrounding jacket 18, as described in connection with Fig. 1.

As here shown, the impregnated medium falls from the discharge device 41 through a closed intake 59 into a leaching apparatus for releasing and recovering the odors by solution. This apparatus comprises a moderately inclined oval conduit 61 and an endless screw conveyor 62 therein, accurately fitting its lower portion only, with considerable clearance above it. The medium falls into the conveyor 62 near its lower end, and is gradually elevated and delivered from the upper end of the conduit 61, into a subjacent receptacle 63. As the medium is thus progressively elevated and concurrently agitated, it is washed by a counterflow of alcohol, say, admitted to the upper end of the conduit 61 through a pipe 64 leading from a supply tank 65, provided with a control and regulating valve 66. The descending liquid cascades over the medium from convolution to convolution of the screw 62, and thus the two are brought into intimate contact and intermixture. A filter or strainer 67 across the lower end of the conduit 61 prevents any of the powdery medium from washing out with the alcohol, which collects in the receptacle 68 in closed connection with the lower end of the conduit.

I claim as new and desire to secure by Letters Patent of the United States:

1. The process of abstracting odors from flowers which comprises exposing divided adsorbent mineral gel in the presence of the flowers, thereby adsorbing the vaporous flower odors in the gel.

2. A preparation of the character described, comprising adsorbent mineral gel impregnated with vaporous flower odors.

3. In enfleurage, the step which comprises exposing a powdery absorbent medium to flowers in a tenuous atmosphere.

4. The process which comprises intimately interspersing flowers with an interstitious absorbent medium and subjecting them to a tenuous atmosphere, to facilitate transfer of vaporous flower odors to such medium.

5. The process which comprises mixing flowers with an inert powdery absorbent medium and subjecting them to a tenuous atmosphere, to impregnate medium with vaporous flower odors, separating flowers and medium, and leaching the adsorbed odors out of the latter.

6. The method of enfleurage by impregnation of a powdery absorbent medium with flower odors, which comprises progressing such medium and the flowers in opposite directions in odor-transferrent proximity.

7. The method of enfleurage by impregnation of powdery absorbent medium with flower odors, which comprises progressing such medium and the flowers in opposite directions in intimate contact.

8. The method of enfleurage by impregnation of powdery absorbent medium with flower odors, which comprises progressing such medium and the flowers interspersively through one another in countercurrents.

9. The method of enfleurage by impregnation of powdery absorbent medium with flower odors, which comprises causing the medium to fall on and through the flowers while elevating and agitating them in dispersion.

10. The continuous method of enfleurage with a powdery absorbent medium, which comprises progressing such medium and the flowers in opposite directions in odor-transferrent proximity, and then progressing a fluid agent for releasing the odors and the impregnated medium in opposite directions in contact with one another to recover the odors from the medium.

11. The continuous method of enfleurage with a powdery absorbent medium, which comprises progressing such medium and the flowers in opposite directions interspersively through one another, separating impregnated medium and flowers, and progressing a fluid agent for releasing the odors and such medium the one over the other in opposite directions to recover the odors from the medium.

12. The continuous method of enfleurage with a powdery absorbent medium which comprises progressing such medium and the flowers in opposite directions in intimate contact, and elevating the impregnated medium against a downflow of liquid agent for releasing the odors from such medium.

13. The improved process of abstracting odors from flowers which comprises exposing adsorbent powdered silica gel in the presence of the flowers, thereby adsorbing the vaporous flower odors in the silica gel.

14. A preparation of the character described, comprising adsorbent silica gel impregnated with vaporous flower odors.

In witness whereof, I have hereunto set my hand at Baltimore, Maryland, this 28th day of October, 1922.

E. EMMET REID.